(12) United States Patent
Petteruti et al.

(10) Patent No.: US 6,409,401 B1
(45) Date of Patent: Jun. 25, 2002

(54) PORTABLE PRINTER WITH RFID ENCODER

(75) Inventors: Steven F. Petteruti; Majid Amani, both of East Greenwich; Michael L. Lamontagne, Johnston, all of RI (US)

(73) Assignee: Zih Corp., Wilmington, DE (US)

( * ) Notice: Subject to any disclaimer, the term of this patent is extended or adjusted under 35 U.S.C. 154(b) by 0 days.

(21) Appl. No.: 09/817,529

(22) Filed: Mar. 26, 2001

Related U.S. Application Data
(60) Provisional application No. 60/193,282, filed on Mar. 30, 2000.

(51) Int. Cl.[7] .................................................. B41J 3/36
(52) U.S. Cl. ............................ 400/88; 400/76; 400/70; 400/61
(58) Field of Search .............................. 400/88, 76, 70, 400/61

(56) References Cited

U.S. PATENT DOCUMENTS

| | | |
|---|---|---|
| 5,267,800 A | 12/1993 | Petteruti et al. |
| 5,806,993 A | 9/1998 | Petteruti et al. |
| 5,860,753 A | 1/1999 | Beck et al. |
| 6,004,053 A | 12/1999 | Petteruti et al. |
| 6,010,257 A | 1/2000 | Petteruti et al. |

FOREIGN PATENT DOCUMENTS

| EP | 1 093 930 A2 | * 4/2001 |
|---|---|---|

OTHER PUBLICATIONS

WWW.ZEBRA.COM webite page on Bar Code Printers p.7, Sep. 2001.*

Texas Instruments, Inc., TIRIS Radio Frequency Identification Solutions, Product Bulletin, Tag–it Inlays, Copyright 1999.

Philips Semiconductors, Inc., I Code Label, pp. 13–15, Nov. 21, 1997.

TIRIS Technology by Texas Instruments at www.ti.com/mc/docs/tiris/docs/, "Welcome to TIRIS Online", "TIRIS Document Center", "RFID Technology", "TIRIS Benefit" pages, (1998).

Zebra Technologies Corporation, "R–140 Printer Specifications", Rev. 2, pp. 1–2, Feb. 2001.

* cited by examiner

*Primary Examiner*—Andrew H. Hirshfeld
*Assistant Examiner*—Charles H. Nolan, Jr.
(74) *Attorney, Agent, or Firm*—Kenneth J. Lukacher

(57) ABSTRACT

A portable printer is provided having a printer mechanism capable of printing on media and an RFID encoder for encoding information onto RFID circuits coupled to the media. The printer mechanism and RFID encoder are contained in the housing of the printer with a programmed controller for controlling the printer mechanism and RFID encoder. The printer mechanism includes a print head and motor for driving a platen roller to advance the media across the print head and passed the antenna of the RFID encoder. The media may be stored in a compartment in the housing on a roll or fan-fold in which multiple RFID circuits are provided along the length of the media. The programmed controller in the housing operates, responsive to communication received from a host terminal or computer, to send information to the print head to print information on the media and/or information to the encoder to encode the RFID circuit.

20 Claims, 4 Drawing Sheets

PORTABLE PRINTER WITH RFID ENCODER

This application claims the benefit of priority to U.S. Provisional Application No. 60/193,282, filed Mar. 30, 2000, which is herein incorporated by reference.

FIELD OF THE INVENTION

The present invention relates to a portable printer having an RFID (radio frequency identifier) encoder, and particularly to a miniature, portable, printer capable of both printing on media and encoding RFID circuits coupled to the media. The invention is suitable for use in printing indicia, such as barcode, text, and graphics, on labels, tickets, stickers, tags, and other patches, and encoding information on RFID circuits coupled to the same media, where the encoded information may be related to the printed indicia. The printer operates responsive to a host terminal or computer to provide RFID circuit encoding with or without printing on the media.

BACKGROUND OF THE INVENTION

Miniature portable printers have been used on factory floors, in warehouses, and in retail establishments for ticket printing and inventory control. For example, such portable label printers are described in U.S. Pat. Nos. 6,004,053, 5,806,993, and 5,267,800. These printers print indicia, such as text, bar codes, or graphics, on media, such as adhesive-back label stock or paper, from a roll in the printer's housing. Being miniature, such portable printers are more useful than heavier stationary or briefcase printers, as they are of a small weight and size to be easily carried or worn by a user.

Recently, RFID circuits or smart chips have been developed which represent thin, battery-less, transponders attachable to a substrate. These RFID circuits can be encoded to store digital information, and then read by a reader-unit designed to capture the information stored in the RFID circuit at certain radio frequencies. Data can be read from an RFID circuit at a distance from an RFID reader, and often do not require the RFID circuit to be in sight of the reader. Examples of RFID circuits include the TIRIS RFID transponders manufactured by Texas Instruments, Inc., Dallas, Tex., or Icode RF ICs, manufactured by Philips Semiconductor. Often, such RFID circuits are referred to as RF tags.

Although the miniature portable printers mentioned above can print on various types of media, such printers are not capable of storing digital information on media having RFID circuits. Accordingly, it would be desirable to provide a miniature portable printer capable of encoding RFID circuits attached to the same media upon which the printer prints. Such a portable printer would provide advantageous features of small size and weight, and the ability to produce labels, or other types media, which can identify an object by both printed matter and/or RF signals.

One printer having RFID encoding capability is the 140XiII Printer, manufactured by Zebra, Inc, of Vernon Hills, Ill. However, this printer is neither portable, nor miniature in weight and size.

SUMMARY OF THE INVENTION

It is the principal object of the present invention to provide a portable printer capable of both printing on media and encoding RFID circuits coupled to the media.

It is another aspect of the present invention to provide a portable printer for printing on media and encoding RFID circuits coupled to such media in which the information printed on the media can be related to the information encoded.

Briefly described, the portable printer of the present invention has a printer mechanism for printing on media and a RFID encoder for encoding information onto RFID circuits attached, or bonded, to the media to provide integrated RFID media. The printer mechanism and RFID encoder are contained in a housing of the printer with a programmed controller for controlling the printer mechanism and the RFID encoder. The printer mechanism includes a print head and a motor for driving a platen roller to advance the media across the print head and passed the antenna of the RFID encoder, such that one surface of the media is presented to the print head upon which indicia, such as text, graphics, or barcodes, may be printed. The media is stored in a compartment in the housing on a roll or fan-fold in which multiple RFID circuits are provided along the length of the media. The programmed controller in the housing operates, responsive to communication received from a host terminal or computer, to send information to the print head to print information on the media and/or information to the encoder to encode the RFID circuit, via the antenna of the encoder.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 1:
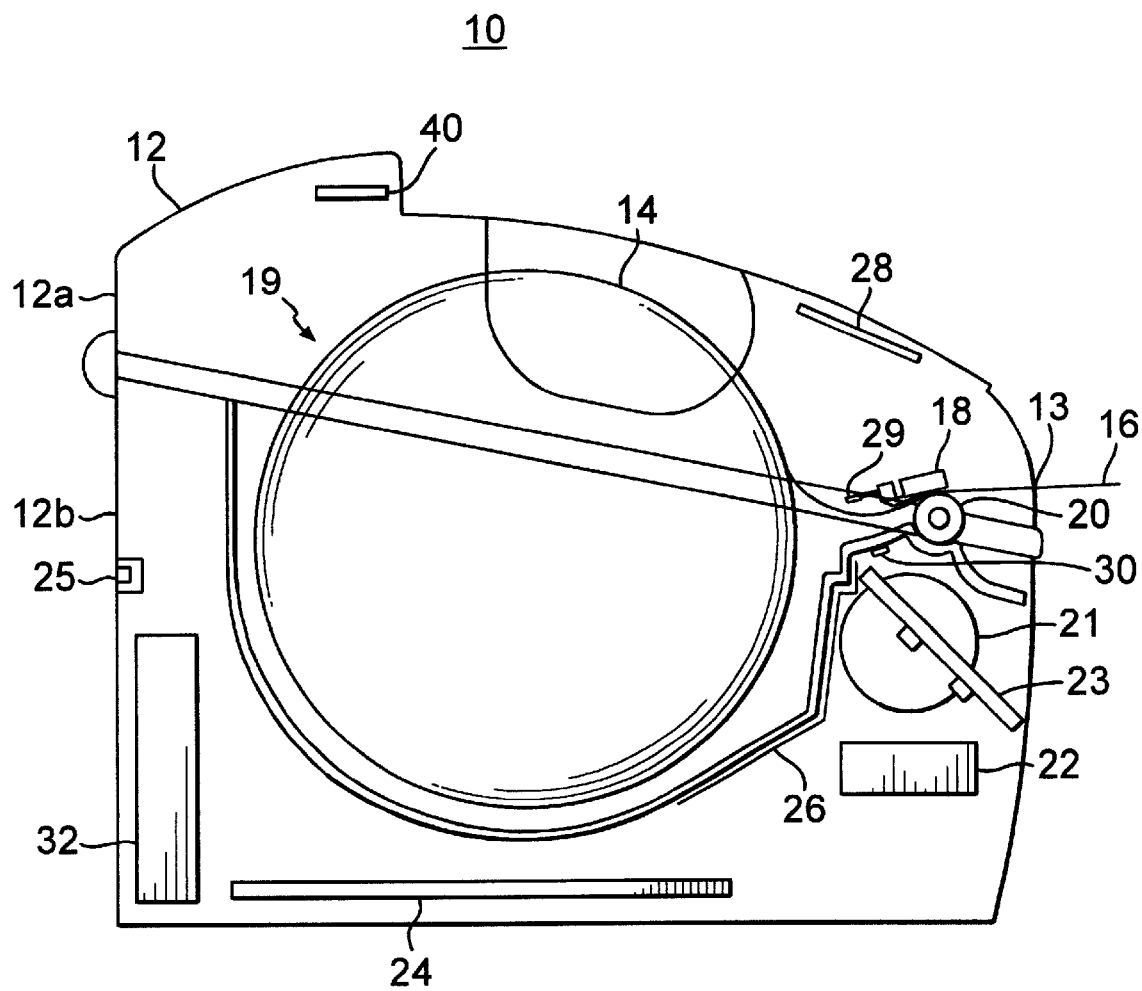
FIG. 1 is a block diagram of the portable printer according to the present invention.
Figure 1A:
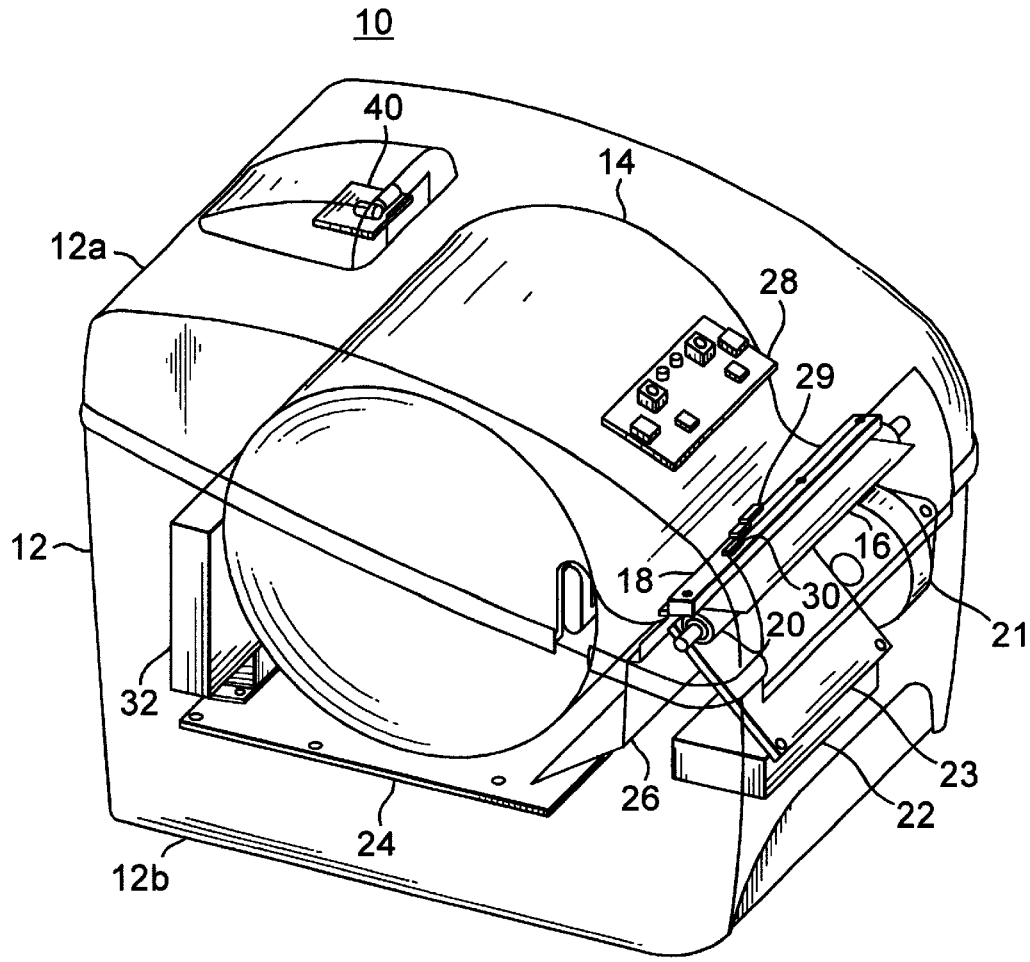
FIG. 1A is a perspective view of the portable printer of FIG. 1.

Referring to FIGS. 1 and 1A, a portable label printer 10 is shown having a housing 12 with a print head 18, a roll of media 14 upon which is wound integrated RFID media 16 capable of being advanced from the roll 14 by a rotatable platen roller 20 driven by (step) motor 21. A printer control circuit board 24 has electronics, including a microprocessor controller 34 (FIG. 2), for controlling the print head 18 and actuating motor 21 to drive media 16 across the print head 18. Such electronics, print head, motor, platen roller, and related components of the printer mechanism, may be the same as the portable printers described in U.S. Pat. Nos. 5,806,993, 5,267,800, 5,860,753, 6,004,053, or 6,010,257, which are herein incorporated by reference. The roll 14 may be stored in a cavity or chamber 19 in the housing 12 and threaded across the platen roller 20 to extend through an opening 13 in the housing 12. Optionally, the media may be stored in the chamber 19 of the housing 12 in a fan-fold orientation. The printer 10 weights less than about two pounds and is miniature in size having a volume of less than about 189 cubic inches. The printer housing 12 has a cover member 12a hinged to a base member 12b to enable loading of a roll 14 (or fan fold) of media 16 in the housing and threading the media 16 across platen roller 20. The printer housing may be similar to the portable printers described in the above incorporated patents.

Figure 1B:
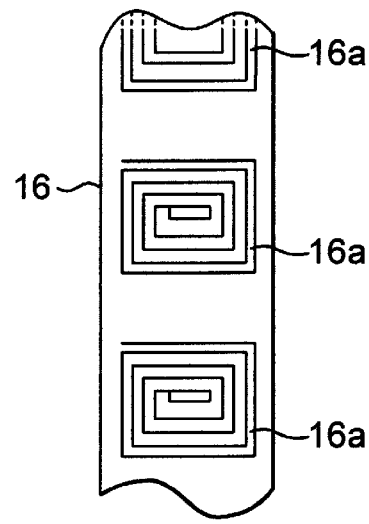
FIG. 1B is an example of the media coupled to RFID circuits used in the printer of FIG. 1.

Media 16 has RFID circuits 16a coupled thereto, such as by adhesive or other attaching/bonding means, at set intervals along the length of the media 16 to provide the integrated RFID media, as shown for example in FIG. 1B. Media 16 may be paper, plastic strip, adhesive-backed labels attached to a carrier, or other substrate, in which one side of the media 16 provides a surface upon which information can be printed, and the other side is coupled to the RFID circuits 16a. Alternatively, the RFID circuits 16a may be attached/bonded between two strips of paper or plastic, or other two substrates, in which printing may occur on either side depending on media orientation. The RFID circuits 16a may be, for example, TIRIS transponders manufactured by Texas Instruments, such as the Tag-it Inlays, or such RFID circuits manufactured by Philips Semiconductor, such as Icode RF IC. Other thin RFID circuits may be used, and the RFID circuits are not limited to those described above.

Portable label printer 10 further includes an RFID (read/write) encoder 22 having a RFID antenna 23 capable of encoding by RF signals on the RFID circuit positioned near the antenna. RF shielding 26 is provided in housing 12 to avoid the possibility of encoding other RFID circuits of media 16, but for the RFID circuit of the media 16 at a position near print head 18 adjacent antenna 23. The RFID encoder 22 operates in accordance with programmed microprocessor controller 34 (FIG. 2) on the printed circuit board 24 to write data onto the RFID circuit, such as information as: in a retail environment, product price, type, or other identifier; in a warehouse environment, product information, quantity, or location; and in a baggage ticket, flight information, owner, or baggage identifier. For example, when Tag-it Inlays TIRIS transponders are used, 256 bits may be programmed upon the RFID circuit by RFID encoder 22. The RFID encoder 22 also is capable of reading an RFID circuit before encoding to read information previously stored in the circuit, such as a unique address or code associated with the RFID circuit, or after encoding to verify that the RFID circuit has been properly encoded with data. Texas Instruments or Philips Semiconductor also manufactures such a RF read/write encoder 22, such as an IC chip, for use with their respective RFID circuit transponders. The controller 34 operates the RFID encoder 22 to store digital information or data, which may be related to information printed by the print head 18 upon the same part of the media having the RFID circuit. For example, when such media represents labels to be applied to products, the information stored in the RFID circuit may represent an identifier(s) or characters defining the product, barcode or other identifying data.

The controller 34 enables the printer 10 to communicate with a host terminal or host computer via RF or infrared signals, or by cable coupled to an RS-232 port 25 on the printer, as described in the incorporated patents. LED indicators and keypad 28 are provided on the housing 12 to enable the user to interface with the printer 10. Two optional sensors 29 and 30, such as photo-diodes, may be provided in the printer. Gap sensor 29 senses the gap between labels on the media via a pulse signal from the sensor,to the controller 34, such that the controller 34 may actuate the motor 21 to advance the media 16 to a proper location for printing and/or RFID encoding. Index mark sensor 30 is directed to the media to read indicia, such as a mark or barcode on the backside of the media 16, and to send to the controller 34 signals representative of the presence or absence of bars or spaces. Sensor 30 may also provide for sensing the presence of media 16, in addition to, or instead of, sensing an index mark or barcode. A power source 32, such as a battery, is located in housing 12 to supply power to the components on the printer control circuit board 24 and to other components requiring power in the printer.

Figure 2:
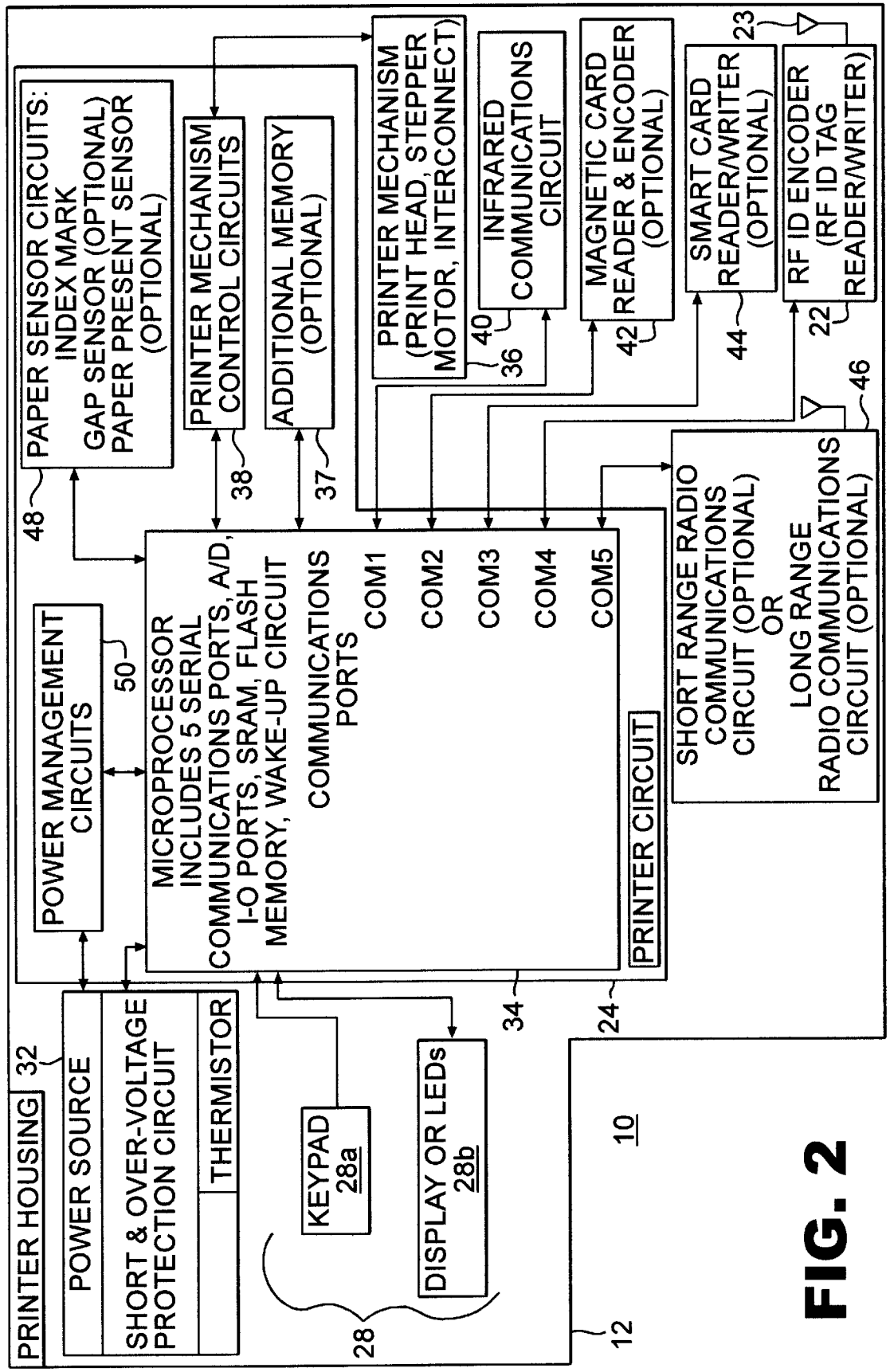
FIG. 2 is a schematic control diagram of the portable printer in accordance with the present invention.

Referring to FIG. 2, a schematic block diagram of the printer 10 is shown having the printed circuit board 24 with microprocessor controller 34. The controller 34 is coupled to a printer mechanism 36, via print mechanism control circuits 38, and to RFID encoder 22, via a communication port of the controller 34. The printer mechanism 36 includes the print head 18, motor 21, and interconnections to the printer mechanism control circuits 38. Optionally, the printer 10 may have one or all of the following components coupled for communication through the controller's communication ports: infrared communication circuits 40, magnetic card reader and encoder 42 (such as described in U.S. Pat. No. 6,004,053), smart card reader/writer 44, and short or long range radio communication circuit 46. Paper sense circuits 48 include sensors 29 and 30 to provide signals to controller 34 as described earlier. Keypad 28a and display or LEDs 28b are coupled to input/output ports of the controller 34. Power management circuits 50 to power source 32 enable the controller 34 to turn on/off (low power) power of the printer 10 in response to keypad 28a or to conserve power. The controller 34 is programmed with software to send and receive signals from the RFID encoder 22, such that RFID circuit 16a in vicinity of the encoder 22 can encode, or read data from, the RFID circuit. The particular data communication protocol depends on the RFID encoder 22 manufacturer.

Figure 3:
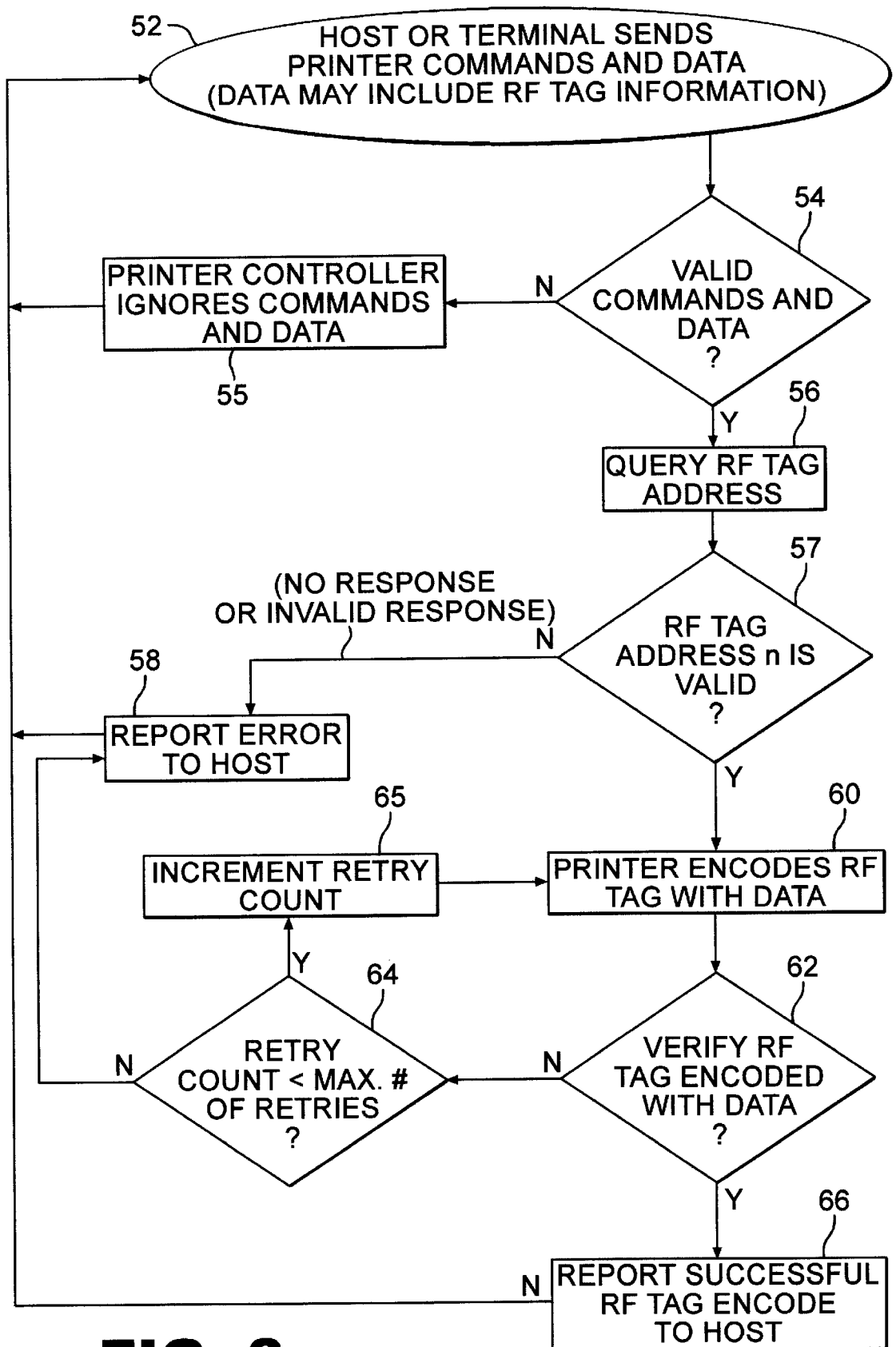
FIG. 3 is a flow chart illustrating the program operating with portable printer of FIGS. 1 and 2 for encoding an RFID circuit.

Referring to FIG. 3, a flowchart is shown for the RFID encoding program (software) for the printer 10. (In this figure, the RFID circuit is referred to as a RFID tag.) The programming for enabling printing with printer mechanism 36 is in accordance with the operation of electronics (controller) in the above-incorporated patents. The program may be stored in memory of the controller 34, such as SRAM, FLASH, or external memory 37 (FIG. 2). The host terminal or computer sends to the printer 10, via one of RF radio, infrared, of serial cable, commands and data, such commands can direct the printer controller 34 to print on media using the print mechanism 36, or direct the printer controller 34 to encode or read an RFID circuit 16a on media 16 (step 52). The controller 34 responds to such commands which direct RFID circuit encoding in accordance with FIG. 3, and the data associated with the commands may include RF tag information, such as product name, description, weight, or id number. In response to receiving such commands and data, the printer first determines whether the commands and data are valid (step 54). Validity may include whether the printer 10 is associated with an address or printer-type specified in the command, and whether the command is one of a set of valid commands. If the command and data is not valid, the printer ignores the command and data (step 55) and the controller 34 branches back to step 52. If the commands and data are valid, the controller 34 directs the encoder 22 to query (read) the RFID tag address (or tag identifier) of the RFID circuit on the media adjacent the encoder's antenna (step 56). The controller 34 then checks if the RFID address read is valid (step 57). If the RFID circuit returns no response or an invalid response, the controller 34 sends a message to the host that an error has occurred (step 58), otherwise, the controller 34 encodes (stores or records) the RFID with the received data (step 60). The controller is programmed to determine which RFID address is valid for the type (or manufacture) of RFID circuit being used. The controller 34 optionally may also send to the host the address (or tag identifier) of the RFID circuit.

Using the encoder 22, the controller 34 next reads the RFID circuit to verify that the tag was encoded with the data (step 62). If the data read does not match the data encoded, the controller checks if a Retry Count variable has exceeded a maximum number of retries (step 64), and if not, increments the Retry Count variable by 1 (step 65) and attempts to encode the RFID circuit again with the data (step 60). The Retry Count variable is in memory of the controller 34 and is reset to zero before the first attempt to encode data, such as at step 52 or 56. For example, the maximum number of retries may be three. If after the maximum of retries through steps 60, 62, 64 and 65, the RFID circuit could not be successfully encoded (i.e., data not verified at step 62), the controller 34 branches to step 58 from step 64 to send a message to the terminal or host computer that an encoding error has occurred and returns to step 52. If the data read by the encoder at step 62 matches the data sent to the encoder, the controller 34 sends a message to the terminal or host computer reporting that the RFID circuit was successfully encoded (step 66), and then returns to step 52. In this manner, the printer 10 encodes information on the RFID circuits of media 16. The media 16 can be printed upon before, after, or during such encoding.

The controller 34 operates the motor 21 to rotate platen roller 20 to drive the media 16 along a path across the print head 18 for printing on the media and to position each of the RFID circuits 16a coupled to the media for reading or encoding by encoder 22 via antenna 23. Thus, when the media 16 represents a series of labels in which each label has an RFID circuit, the media is advanced to enable printing on each of the labels and encoding their respective RFID circuits, such that the information printed corresponds, or relates, to the information encoded. Optionally, the controller may operate to provide for encoding without printing on the media, ax and vice versa, printing without encoding.

From the foregoing description, it will be apparent that there has been provided an improved portable printer with an RFID encoder. Variations and modifications in the herein described printer in accordance with the invention will undoubtedly suggest themselves to those skilled in the art. Accordingly, the foregoing description should be taken as illustrative and not in a limiting sense.

What is claimed is:

1. A portable printer for printing information on media comprising:
    means for printing first information on media in which said media has at least one RFID circuit coupled thereto;
    means for encoding second information onto said RFID circuit; and
    a portable housing comprising at least said printing means and said encoding means, wherein said housing weighs less than two pounds.

2. The portable printer according to claim 1 further comprising:
    means for storing said media in said housing on one of a roll and fan fold orientation.

3. The portable printer according to claim 1 further comprising:
    a controller in said housing capable of providing said first information to said printing means and said second information to said encoding means in which said printing means and encoding means operate responsive to said controller.

4. The portable printer according to claim 1 wherein said first information on said media is associated with said second information encoded on the RFID circuit.

5. The portable printer according to claim 1 wherein said encoding means further comprises means for reading an RFID circuit to receive an address associated with the RFID circuit.

6. The portable printer according to claim 1 wherein said encoding means further comprises means for reading an RFID circuit to verify that an encoded RFID circuit was successfully encoded.

7. The portable printer according to claim 1 further comprising said media in which said media has a plurality of different ones of said RFID circuit capable of being encoded by said encoding means and printed upon by said printing means.

8. A method for encoding an RFID circuit in a portable printer capable of communication with a host, said method comprising the steps of:
    receiving commands and data from the host;
    verifying that a RFID circuit stored in the printer is valid; and
    encoding information on the RFID circuit in accordance with said received commands and data, wherein said receiving, verifying and encoding steps are carried out in a portable printer weighing less than two pounds.

9. The method according to claim 8 wherein said RFID circuit represents one of a plurality of RFID circuits in said printer.

10. The method according to claim 8 wherein said verifying step further comprises the steps:
    reading an address from the RFID circuit; and
    determining whether the read address is valid.

11. The method according to claim 10 wherein said read address of the RFID circuit is transmitted to the host.

12. The method according to claim 8 wherein said RFID circuit is coupled to media in said printer, said information encoded represents first information, and said method further comprises the step of printing on said media second information in accordance with said commands and data, in which said first information corresponds to said second information.

13. The method according to claim 8 further comprising the step of reporting to the host whether the RFID circuit was successfully encoded.

14. A portable printer for printing information on media comprising:
    media having one or more RFID circuits;
    a housing having a printhead capable of printing on said media, an encoder capable of reading or encoding information on the RFID circuits of said media, and a controller for controlling said printhead and said encoder; and
    a rotatable platen roller and a motor coupled to said platen roller in said housing which operates responsive to said controller to drive said media across said printhead and to position each of said RFID circuits for reading or encoding by said encoder, wherein said housing weighs less than two pounds.

15. The printer according to claim 14 wherein said media represents one of adhesive backed labels, plastic strip, and paper having said RFID circuits coupled thereto along the length of the media.

16. The printer according to claim 14 wherein said housing is portable.

17. The printer according to claim 14 wherein said media is supplied by one of a roll or fanfold of said media stored in said housing.

18. The printer according to claim 14 wherein said information encoded on each of said RFID circuits represents first information and said printhead prints second information on said media which is associated with said first information encoded on the RFID circuit adjacent said printed second information.

19. A method for printing information on media in a portable printer comprising the steps of:

printing on media in which said media has at least one RFID circuit coupled thereto; and encoding said RFID circuit, wherein the printing and encoding steps are carried out in a housing weighing less than two pounds.

20. A portable printer for printing information on media comprising:

media having one or more RFID circuits; and a housing having a printhead capable of printing on said media, an encoder capable of reading or encoding information on the RFID circuits of said media, and a controller for controlling said printhead and said encoder, wherein said housing weighs less than 2 pounds.

* * * * *